United States Patent
Spanyar

[19]
[11] Patent Number: 6,155,841
[45] Date of Patent: Dec. 5, 2000

[54] DEVICE FOR ELECTRICALLY CONNECTING A MOBILE PHONE TO A KEYBOARD

[76] Inventor: Horst Spanyar, Häfnerstrasse 15, D-72631, Aichtal, Germany

[21] Appl. No.: 09/447,522

[22] Filed: Nov. 23, 1999

[30] Foreign Application Priority Data

Nov. 23, 1998 [DE] Germany ............................ 198 53 899

[51] Int. Cl.[7] ............................................. H01R 33/00
[52] U.S. Cl. .............................. 439/37; 379/446; 368/10
[58] Field of Search ............................ 439/37, 484, 483, 439/476.1; 379/446, 447, 455, 454, 433; 368/10; 235/462, 472; 361/686, 680; 455/348; 179/2 DP

[56] References Cited

U.S. PATENT DOCUMENTS

| | | | |
|---|---|---|---|
| 3,976,840 | 8/1976 | Cleveland et al. ..................... | 179/2 DP |
| 4,227,258 | 10/1980 | Root et al. ............................. | 455/348 |
| 4,847,818 | 7/1989 | Olsen ....................................... | 368/10 |
| 4,901,345 | 2/1990 | Imagawa ................................. | 379/387 |
| 5,183,193 | 2/1993 | Brandell ................................. | 224/219 |
| 5,191,197 | 3/1993 | Metlitsky et al. ...................... | 235/472 |
| 5,239,521 | 8/1993 | Blonder ..................................... | 368/10 |
| 5,272,324 | 12/1993 | Blevins .................................... | 235/462 |
| 5,305,181 | 4/1994 | Schultz .................................... | 361/380 |
| 5,309,328 | 5/1994 | Lum ......................................... | 361/809 |
| 5,329,106 | 7/1994 | Hone et al. .............................. | 235/472 |
| 5,657,201 | 8/1997 | Kochis .................................... | 361/686 |
| 5,659,611 | 8/1997 | Saksa ...................................... | 379/433 |
| 5,808,289 | 9/1998 | Becker .................................... | 235/472 |
| 6,028,930 | 2/2000 | Chen ....................................... | 379/446 |
| 6,035,035 | 3/2000 | Firooz ..................................... | 379/433 |
| 6,036,093 | 3/2000 | Schultz ............................... | 235/462.44 |
| 6,044,153 | 3/2000 | Kaschke ................................. | 379/433 |
| 6,078,803 | 6/2000 | Martinez et al. ...................... | 455/349 |

*Primary Examiner*—Gary F. Paumen
*Assistant Examiner*—Phuongchi Nguyen

[57] ABSTRACT

A film keyboard is sewn into an end of the sleeve of a jacket. A cable leads from it to a first plug-type connector, on whose opposite end a rubber band engages, said rubber band being supported in terms of forces at another point on the end of the sleeve. If the nebber band is located between the thumb and index finger, the first plug-type connector is thus inevitably held in such a position that it can easily be plugged into a second, corresponding plug-type connector of a mobile phone when the latter is held in the hand in the usual way. When not in use, the first plug-type connector is held concealed in the end of the sleeve.

4 Claims, 3 Drawing Sheets

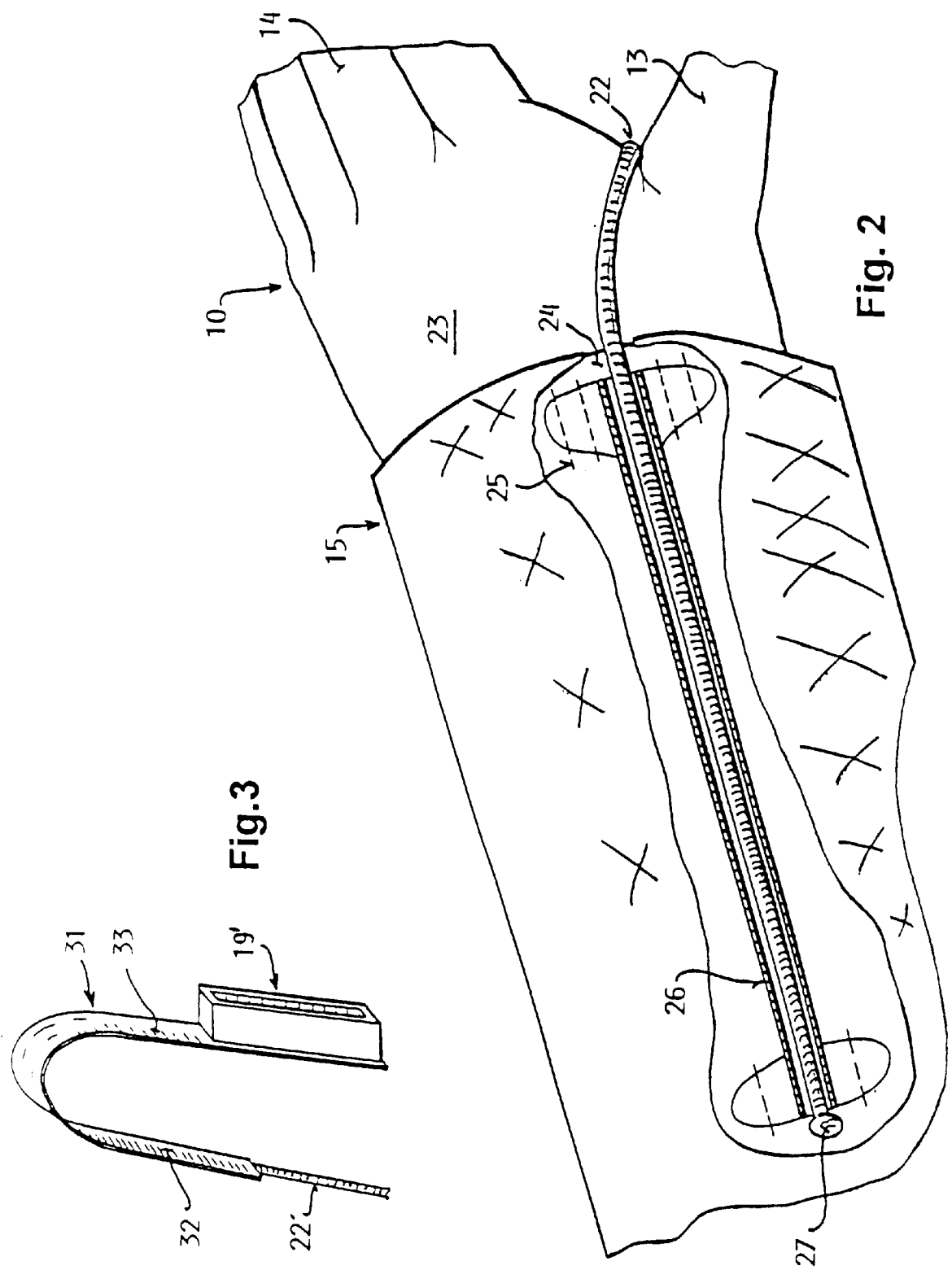

DEVICE FOR ELECTRICALLY CONNECTING A MOBILE PHONE TO A KEYBOARD

Cross-References to Related Applications

Not applicable.

Statement Regarding Federally Sponsored Research or Development

Not applicable.

BACKGROUND OF THE INVENTION

1. Field of the Invention

The invention relates to a device for electrically connecting a mobile phone to a keyboard.

The links between mobile phones and the Internet are becoming stronger and stronger. In this context they are increasingly used as combination devices for voice and text communication. Usually, alphanumeric characters are input by means of multiple activation of the numerical keys, which is extremely awkward and therefore only suitable for short messages. In some mobile phones it is possible to connect an external alphanumeric keyboard by means of a connecting cable, which is only possible in quasi-stationary use (for example in a car) because of the awkward handling.

2. Description of Relevant Art

In FOCUS 46/1997, there are reports of the predictions of a group of scientists from the MIT Media Lab in Cambridge to the effect that computers and other electronic devices will be integrated into items of clothing. One concept which is illustrated is, for example, a keyboard which is integrated in the front armpit region of a denim jacket behind which a synthesizer chip is to be concealed. The positions of the concealed keyboard are symbolized ornamentally on the outside of the material. The keyboard is reliably conceived as a film keyboard which is very thin and can be bent in a somewhat elastic way and is already generally available. However, in these concepts it is always assumed that all the interacting components (keyboard, synthesizer chip) are accommodated together in one item of clothing.

SUMMARY OF THE INVENTION

The object of the invention is to provide a device of the generic type which makes it possible to use an external keyboard in conjunction with a mobile phone in a convenient way and at the same time provides a plug-in connection which is easy to handle eregonomically.

This object is achieved by means of the features of the present invention.

The first plug-type connector is inevitably held in the right-hand position on the ball of the thumb by means of the strap-device which is held between the thumb and the index finger, with the result that as the mobile phone is picked up it is also very easy to make the electrical connection between the keyboard and mobile phone. When not in use, the first plug-type connector disappears from the exposed position, but is easy to access at any time. Because a film keyboard is provided in or on an item of clothing (preferably the sleeve of the jacket), the person wearing the clothing always has the keyboard, which is unnoticeable in terms of weight, on him.

A refinement of the invention causes the strap device to be retracted into the sleeve by means of an elastic tensile element, such as in particular a rubber band. Because the strap device is anchored to two edge points of the end of the sleeve which lie approximately diametrically opposite one another, it gives rise to a certain orientation and securing of the sleeve with respect to the thumb, and thus with respect to the lower arm of the carrier, in the position of use, so that if it is integrated in the sleeve region the keyboard is always located in a position which is convenient for use.

In this context, a development of the invention has the effect that even when the tensile element is stressed, the sleeve remains extended so that the keyboard can be easily activated.

In a variant of the invention, it is possible to dispense with an elastic tensile element. The cuff (or a portion of a cuff) must however match the jacket in terms of appearance.

BRIEF DESCRIPTION OF THE DRAWINGS

Further advantages and refinements of the invention emerge from the following description of exemplary embodiments with reference to the drawing, in which:

FIG. 2 shows the f irst variant, viewed in the direction of the back of the hand, FIG. 3 shows a second variant of a strap device in a schematic, perspective view.

DETAILED DESCRIPTION OF PREFERRED EMBODIMENT

Figure 1:
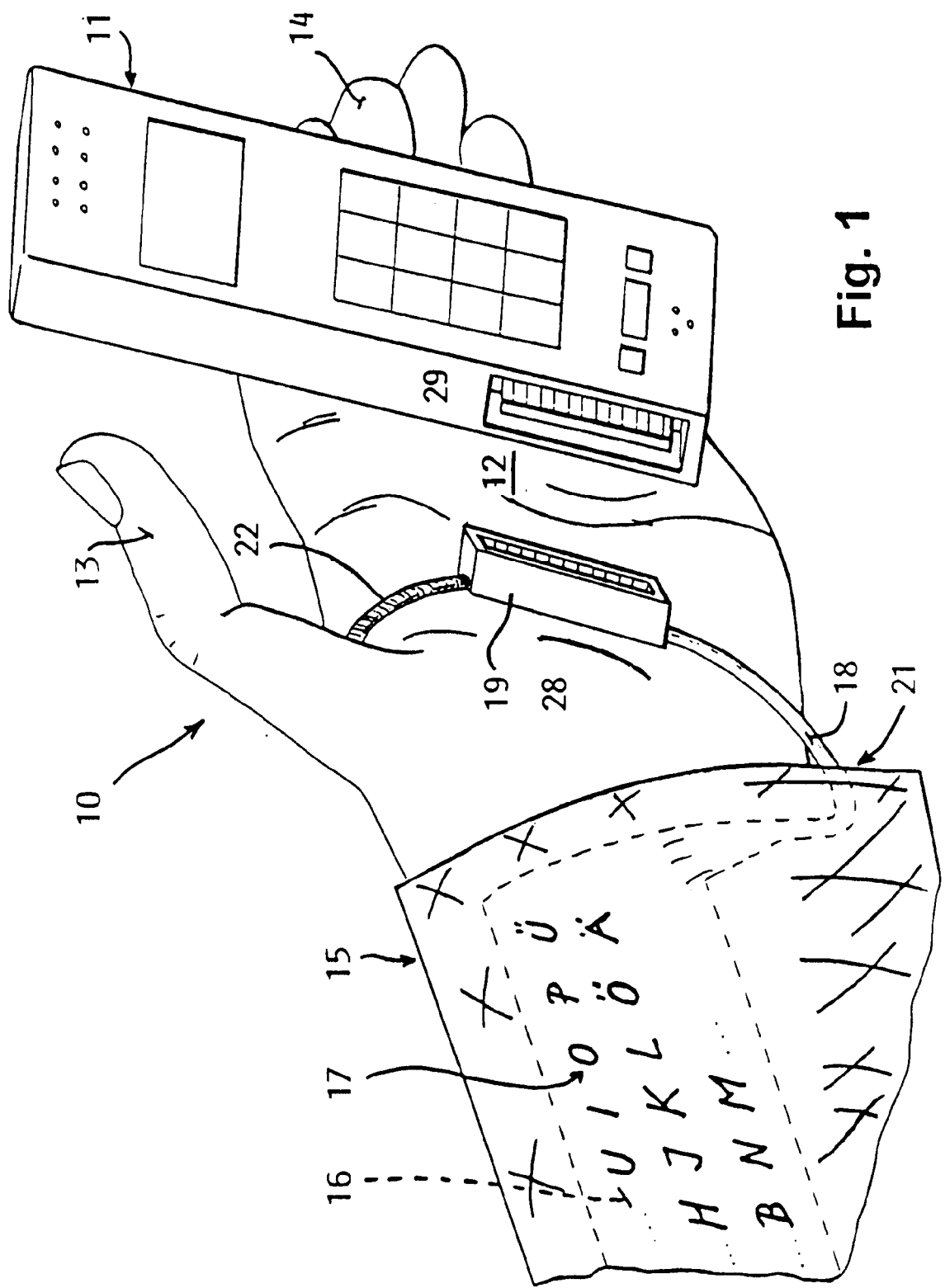
FIG. 1 shows the first variant of a device according to the invention in a schematically simplified way, in the position of use and in the state before contact is made with the mobile phone, and viewed in the direction of the ball of the thumb.

According to FIG. 1, a hand 10 is about to take hold of a mobile phone 11 in the vicinity of the hollow 12 of the hand between the thumb 13 on one side and the other fingers 14 on the other. The forearm is surrounded by an end 15 of a sleeve of a jacket, for example. In the material of the end 15 of the sleeve a film keyboard 16 is concealed and secured, the positions of the keys being marked by symbols 17 (alpha or alphanumeric symbols) corresponding to the keyboard of a typewriter. The symbols 17 can be printed or embroidered onto the outside of the material, to give the desired appearance. A longitudinally inelastic (as cables usually are) multi-conductor cable 18 leads from the film keyboard 16 to the lower end of a multipin first plug-type connector 19 (which is illustrated here, for example, as a flat plug-in socket). In the position of use illustrated, the cable 16 is secured in a nonextensible fashion to a lower, first edge point 21 of the end 15 of the sleeve.

A rubber band 22 leads from the upper end of the first plug-type connector 19 between the thumb 13 and the index finger to the back 23 of the hand (according to FIG. 2) and enters, at a second edge point 24 of the end 15 of the sleeve which is at the top in the position of use, into a longitudinally incompressible plastic tubelet 26 (indicated by seams 25) which is secured there, which extends approximately as far as the elbow of the arm and is also fixed therefore. The end 27 of the rubber band 22 is thickened and is thus held resting against the left-hand edge (FIG. 2) of the plastic tubelet 26. The rubber band 22 is guided in the longitudinally moveable way in the interior of the plastic tubelet 26. It is important that when the rubber band is placed around the thumb 13 the tensile force of said rubber band 22 is condicted by the plastic tubelet 26 to the second edge point 24 so that here the end 15 of the sleeve is pulled towards the thumb 13. The plastic tubelet 26 can also have a flat or oval cross section corresponding to the respective cross section of the rubber band 22. The cross section must be selected such that the plastic tubelet 26 does not bend too much when there is maximum tensile stressing of the rubber. It can also be attached (not illustrated) to one longitudinal edge of the film keyboard or integrated into it, which increases the longitudinal rigidity. The first and second edge point 21, 24 are at a distance so far apart from one another in the circumferential direction (around the wrist) that the free length of the cable 18, including the length of the first plug-type connector 19, is smaller than this distance so that the plug-type connector 19 is pulled back behind the extreme edge of the end 15 of the sleeve when the rubber band 22 is moved out of the position of use shown in the figures over the thumb 13 and back into a position of rest (not shown). In the position of rest, the first plug-type connector 19 is virtually invisible. The free length of the cable 18, the first plug-type connector 19 and the rubber band 22 together form a strap device by means of which the first plug-type connector 19 (in the position of use illustrated) is inevitably positioned and held in the vicinity of the ball 28 of the thumb of the hand 10 in such a way that electrical connection to the mobile phone 11 can easily be made when it is held in the usual way.

For this, the mobile phone 11 has, on the side facing the ball 28 of the thumb, a corresponding, second plug-type connector 29 (illustrated here as a countersunk flat-type connector) so that the two plug-type connectors 19 and 29 engage one in the other when the mobile phone 11 is held in the hand 10 in the usual way. Admittedly the example is tailored to a situation in which the mobile phone is held with the left hand.

The number of conductors and plug pins depends on how the keys affect the mobile phone. If a transducer IC which generates key-coded, serial signals is already integrated into the film keyboard, one signal line, combined with two lines for supplying power to the transducer IC from the mobile phone, is sufficient. If the IC generates, for example, four parallel signal bits, six lines are necessary. However, if the key coding takes place in the mobile phone, it is necessary to have a number of lines which corresponds to the number of keys, which is certainly less expedient.

The strap device illustrated in FIG. 3 is composed of an approximately U-shaped, dimensionally stable, but preferably spring-elastic carrier 31, which is intended to rest with a first limb 32 against the back 23 of the hand (FIG. 2). Its end is extended by means of a rubber band 22', which can correspond in the rest of its course to the rubber band 22 of FIG. 2. The second limb 33 is intended to extend to the hollow 12 of the hand and rest there in particular against the ball 28 of the thumb (FIG. 1). In this region, the first plug-type connector 19' is attached to the second limb 33. In this variant, the strap device does not therefore necessarily extend to two edge points on the end of the sleeve which are at a distance from one another. The electrical connection between the plug-type connector 19' and the film keyboard can be effected by means of a ribbon cable (not shown), which is, for example, cast in the carrier 31 and then continued parallel to the rubber band 22'. Instead of a rubber band, it is also possible to provide a cable which can be inserted into the plastic tubelet 26 (corresponding to FIG. 2). The tensile stress in the direction of the sleeve is in fact not absolutely necessary in this variant if the carrier 31 is held tight in the hand (at any rate until the mobile phone has been picked up and plugged in).

Figures 4, 5:
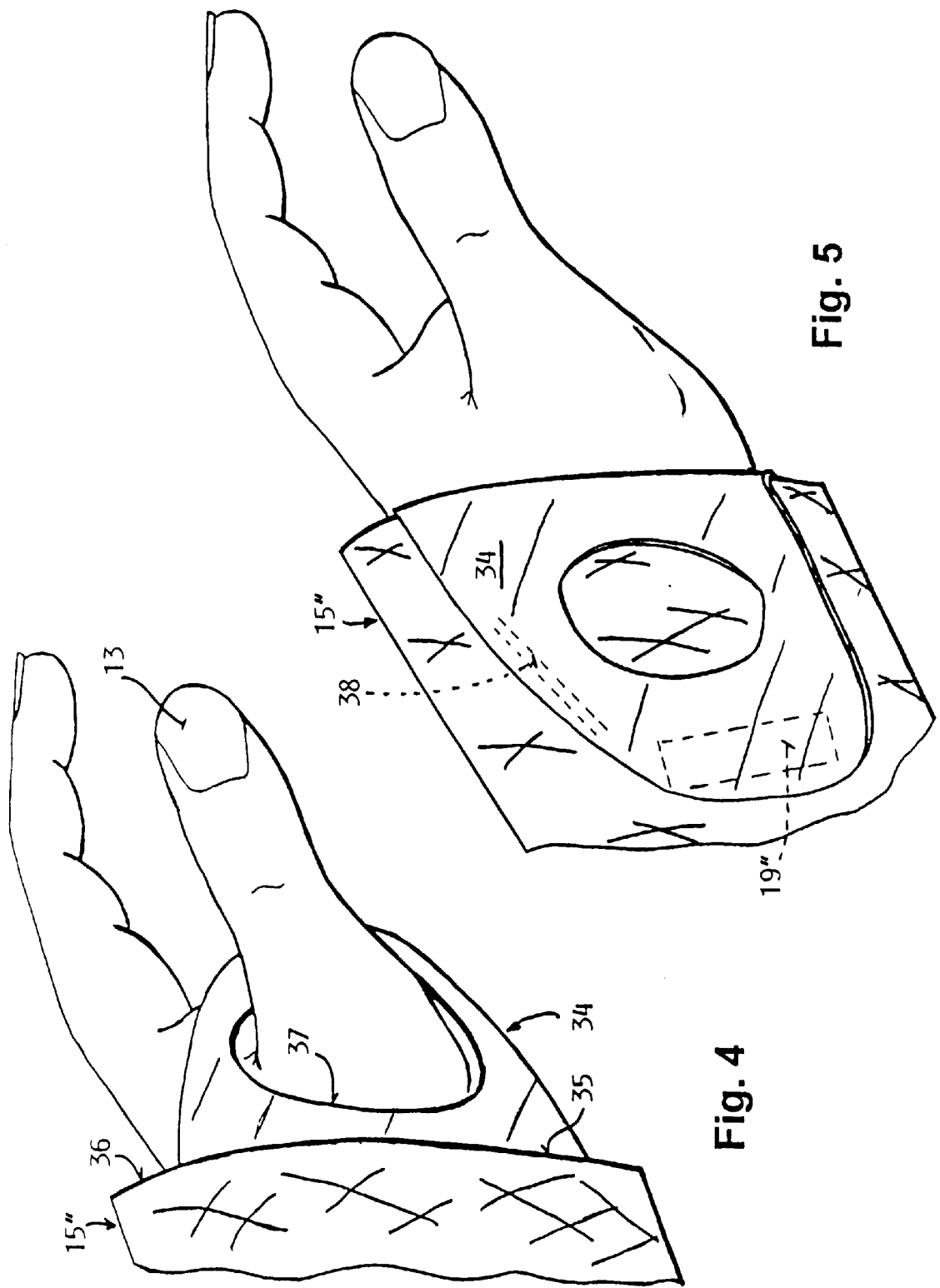
FIG. 4 shows a third variant of a device according to the invention in the position of use of the strap device (without mobile phone)
FIG. 5 shows the third variant in the position of rest of the strap device.

According to FIG. 4, the strap device is formed by a folded-over cuff 34 which is approximately in the shape of a semi-ellipse whose straight longitudinal side 35 is attached to the edge 36 of the sleeve and is folded forward in the position of use so that the thumb 13 can be pushed through an opening 37. In the position of rest according to FIG. 5, the cuff 34 is folded back onto the outside of the end 15" of the sleeve so that the first plug-type connector 19" which is attached to the cuff 34 is held protected and concealed between the cuff 34 and the end 15" of the sleeve. The retention of the cuff 34 in the position of rest can be assured by means of a snap-and-close fastener 38 (not indicated here). This is dependent on the inherent rigidity of the cuff 34. The cable device for connecting the plug-type connector 19" to the keyboard can be formed by copper threads which are sewn or woven into the material of the cuff 34 and then of the adjoining end 15" of the sleeve. As an alternative to the outward folding of the cuff 34 which is illustrated, the cuff can also be folded inward into the inside of the sleeve in the position of rest, making it completely invisible. This is a question of design.

In the above embodiments it has been assumed that the keyboard is positioned in the vicinity of the forearm, which certainly makes the keys easy to use. However, other positions are also possible, for example in the belly region or else also in the thigh region. It is essential that the cable device always be lead through the sleeve to the end of the sleeve and from there to the mobile phone via the strap device.

What is claimed is:

1. A device for electrically connecting a mobile phone to a keyboard, comprising a first plug-type connector (19) connected to a keyboard, a second plug-type connector (29) of a mobile phone, compatible with said first plug-type connector, a strap device (22) that extends in a position of use on the hand (10) of a person, at least from the back (23) of said hand between the thumb (13) and index finger to the hollow (12) of said hand, said first plug-type connector (19) being attached to said strap device in such a way that said first plug-type connector (19) can be positioned in the vicinity of said thumb where said first plug-type connector (19) can be connected to said second plug-type connector (29) when a mobile phone (11) is held in said hand in a usual way, wherein said strap device (22) can be attached to one end (15) of a sleeve of an item of clothing for the upper body of said person in such a way that said strap device (22) is held stabilized in the position of use and can be moved into a position of rest in which at least said first plug-type connector (19) is held concealed in or on the end (15) of said sleeve, further comprising a keyboard (16) that can be applied into or onto said item of clothing, and a cable device (18) that connects said keyboard (16) to said first plug-type connector (19).

2. The device as claimed in claim 1, wherein said strap device (22) comprises a folded-over cuff (34) that is attached to the edge (36) of said sleeve, said cuff (34) having an opening (37) through which a thumb of said hand can be pushed, and parts of said cable device are concealed in the material of said cuff (34).

3. The device as claimed in claim 1, wherein said strap device (22) comprises a longitudinally inelastic cable (18) which extends, as part of said cable device (18), from a first edge point (21) of said end (15) of said sleeve to said first plug-in connector (19), and wherein said strap device (22)

comprises a longitudinally elastic tensile element (22) which extends from a second edge point (24) of said end (15) of said sleeve to said first plug-type connector (19), which tensile element (22) is tensioned in said position of use, and in a position of rest retracts said first plug-type connector (19), substantially relieved of tension, into said sleeve.

4. The device as claimed in claim 3, further comprising a tubelet-like substantially longitudinally incompressible duct (26) concealed in said sleeve, in which duct (26) a significant part of said tensile element (22) is guided in a longitudinally moveable fashion, it being possible to secure an end of said tensile element (22) which is remote from said first plug-type connector (19) in a first end region of said duct, and to attach a second end region of said duct in the vicinity of said second edge point (24) of said end (15) of said sleeve.

\* \* \* \* \*